United States Patent
Aranda Cotero et al.

(10) Patent No.: US 8,383,020 B2
(45) Date of Patent: Feb. 26, 2013

(54) DIELECTRIC FLUID COMPOSITION CONTAINING VEGETABLE OILS AND FREE OF ANTIOXIDANTS

(76) Inventors: Javier Aranda Cotero, Zapopan (MX); David Apolinar Guerra Zubiaga, Monterrey (MX); José Eulalio Contreras De León, San Nicolás de los Garza (MX); Lorena Alvárez Contreras, Chihuahua (MX)

( * ) Notice: Subject to any disclaimer, the term of this patent is extended or adjusted under 35 U.S.C. 154(b) by 0 days.

(21) Appl. No.: 13/140,836

(22) PCT Filed: Dec. 19, 2008

(86) PCT No.: PCT/MX2008/000178
§ 371 (c)(1),
(2), (4) Date: Jun. 19, 2011

(87) PCT Pub. No.: WO2010/071389
PCT Pub. Date: Jun. 24, 2010

(65) Prior Publication Data
US 2011/0291059 A1    Dec. 1, 2011

(51) Int. Cl.
*H01B 3/20*    (2006.01)
(52) U.S. Cl. .......................................... 252/578; 203/34
(58) Field of Classification Search ............... 252/578; 203/34
See application file for complete search history.

(56) References Cited

U.S. PATENT DOCUMENTS

| | | | |
|---|---|---|---|
| 6,340,658 B1 * | 1/2002 | Cannon et al. | 508/491 |
| 6,352,655 B1 * | 3/2002 | McShane et al. | 252/579 |
| 6,398,986 B1 * | 6/2002 | McShane et al. | 252/579 |
| 6,485,659 B1 * | 11/2002 | Goedde et al. | 252/570 |
| 6,726,857 B2 * | 4/2004 | Goedde et al. | 252/570 |
| 7,795,193 B2 * | 9/2010 | Takei et al. | 508/485 |
| 7,902,388 B2 * | 3/2011 | Heise et al. | 554/224 |
| 8,057,835 B2 * | 11/2011 | Makadia et al. | 426/601 |
| 2002/0049145 A1 * | 4/2002 | Cannon et al. | 508/491 |
| 2002/0115875 A1 * | 8/2002 | Kaimal et al. | 554/174 |
| 2006/0030499 A1 * | 2/2006 | Oommen et al. | 508/491 |
| 2008/0058578 A1 * | 3/2008 | Zschau et al. | 588/318 |
| 2009/0140830 A1 * | 6/2009 | Amanullah et al. | 336/94 |

FOREIGN PATENT DOCUMENTS

WO    WO 2005/022558    * 10/2005

* cited by examiner

*Primary Examiner* — Mark Eashoo
*Assistant Examiner* — M. Reza Asdjodi
(74) *Attorney, Agent, or Firm* — Parsons & Goltry; Michael W. Goltry; Robert A. Parsons

(57) ABSTRACT

A dielectric fluid composition containing of 60% to 63% in weight of mono-unsaturated fatty acid, of 20% to 23% in weight of di-unsaturated fatty acid, of 5% to 7% in weight of tri-unsaturated fatty acid, and of 6% to 8% in weight of saturated fatty acid, such that the dielectric fluid is free of antioxidants and/or external additives and has the following properties: a dielectric strength of 40 kV to 70 kV at a separation of 2 mm, a dielectric constant of 2.5 to 3.1 at 25° C., and a dissipation factor of 0.05% to 0.15% at 25° C. The dielectric fluid composition can be obtained by a combination of 95.5% to 99.25% in weight of at least one high oleic vegetable oil, of 0.25% to 1.5% in weight of grape seed oil, of 0.25% to 1.5% in weight of sesame seed oil, and of 0.25% to 1.5% in weight of rice bran oil.

15 Claims, No Drawings

DIELECTRIC FLUID COMPOSITION CONTAINING VEGETABLE OILS AND FREE OF ANTIOXIDANTS

TECHNICAL FIELD OF THE INVENTION

The current invention is related in general to dielectric fluids for apparatus used in the transmission and distribution of electric energy. More specifically, the invention relates to dielectric fluids comprising relatively pure mixtures of vegetable oils and free of external antioxidant compounds.

BACKGROUND OF THE INVENTION

Electrical equipment such as transformers, reactors, capacitors, circuit breakers, among others, use internally dielectric fluids, also known as dielectric oils, which are used as an insulation and dissipation means of heat generated by the internal components of the apparatus.

The dielectric fluid must be able to perform its functions effectively and reliable as a cooling and insulation means during the service life of the electric apparatus.

Obviously, many of the properties of the dielectric fluid should be considered as necessary to provide the expected cooling and dielectric capacity, according to its application, therefore, depending on them its ability to function effectively and reliably may be affected. These properties may include: dielectric strength, dielectric constant, dissipation factor, viscosity, acid number, pour point temperature and ignition temperature.

The dielectric strength of the fluid shows its ability to resist electric breaks at certain frequencies of electrical power and it is measured as the minimum electric voltage required to cause the formation of an arc between two electrodes submerged in the dielectric fluid.

The dielectric constant is the ratio of capacitance of a capacitor with a dielectric (oil) between its plates, and the capacitance of said capacitor where the dielectric is a vacuum. This property is related to the ability of the dielectric fluid to conduct electricity, so that at a lower ability value the capacity of the dielectric fluid will increase.

The dissipation factor of a dielectric fluid is the measurement of dielectric losses in this fluid, usually in the form of heat. A low dissipation factor indicates low dielectric losses and a low concentration of polar soluble contaminants in the dielectric fluid.

The acid number in a dielectric fluid is a measure of the constituents or acidic contaminants of the fluid. The acidity of a dielectric fluid is due to the formation of acid oxidation products. Acids and other oxidation products, together with water and solid contaminants affect the dielectric properties and other properties of the dielectric fluid. The rate of increase in acid number of the dielectric fluid is a good indicator of the rate of aging of said fluid.

Pour point temperature is the temperature at which a fluid flow stops, converting into a solid state under environmental pressure conditions. The pour point temperature can also be defined as the maximum temperature (usually below zero Centigrades) for which the dielectric fluid cannot move or deform with its own weight. The lower this temperature, the easier this dielectric fluid shall be applicable in electrical apparatuses subject to extreme low temperatures below zero ° C.

The ignition temperature, also known as flash point, is that temperature the dielectric fluid must reach to result in the ignition of vapors from said fluid, when exposing them to the air and to the source of ignition.

As dielectric fluids cool off by convection, the electrical equipment where they are applied, the viscosity of these fluids at different temperatures is another important factor to be considered. The viscosity is a measure of the strength of a fluid to flow it is typically analyzed in terms of kinematic viscosity. At low viscosities, the dielectric fluid circulates or flows better inside the appliance and thus allows better heat dissipation.

Among the dielectric fluids used in electric apparatuses and having these and other properties, those dielectric fluids are included based on mineral oils, silicones, synthetic oils, vegetable oils with antioxidants or mixtures thereof.

Dielectric fluids based on mineral oils derived from petroleum, silicone-based oils or synthetic oils have been widely used in electrical transformers, transmission cables and capacitors. Examples of these oils are found in U.S. Pat. No. 4,082,866, U.S. Pat. No. 4,206,066, U.S. Pat. No. 4,621,302, U.S. Pat. No. 5,017,733, U.S. Pat. No. 5,250,750, and U.S. Pat. No. 5,336,847.

Although these dielectric fluids show a good performance as an insulating means and heat dissipation when used in electrical apparatuses, they present a high risk of contaminating the environment, when an accident occurs in which the fluid is spilled, because they contain synthetic elements, which are considered toxic and not biodegradable.

These disadvantages, as well as global environmental trends have resulted in the establishment of more stringent governmental and environmental regulations, requiring the industry to offer ecologic products, that is, products with low impact to the environment.

In response to the former problem, the dielectric fluids based on mineral oils, silicone-based or synthetic, a recently explored alternative is the development of dielectric fluids based on edible oil seeds, that may be seeds of soybean, sunflower, safflower, rapeseed, castor, linseed, cotton, rice, corn, olives and grapes.

It is well known that vegetable oils are deficient in terms of their property of stability to oxidation, that is, react easily with oxygen favoring degradation of the fluid, unlike the type of dielectric mineral, silicone or synthetic oils.

Recently, it has been shown that it is possible to optimize the oxidative properties of dielectric fluids based on edible seeds through changes in the manufacturing processes of the oil, or through the incorporation of synthetic compounds that have the primary role of slowing reactions with the oxygen, and thus, facilitating their use in electrical apparatuses such as transformers. Some of the solutions of vegetable oil dielectrics are described in patent documents GB-609133, CA-2204273, U.S. Pat. No. 5,766,517, U.S. Pat. No. 5,949,017, U.S. Pat. No. 5,958,851, U.S. Pat. No. 6,037,537, U.S. Pat. No. 6,159,913, U.S. Pat. No. 6,184,459, U.S. Pat. No. 6,207,626, U.S. Pat. No. 6,245,726, U.S. Pat. No. 6,274,067, U.S. Pat. No. 6,280,659, U.S. Pat. No. 6,312,623, U.S. Pat. No. 6,340,658, U.S. Pat. No. 6,347,033, U.S. Pat. No. 6,352,655, U.S. Pat. No. 6,398,986, U.S. Pat. No. 6,485,659, U.S. Pat. No. 6,645,404, U.S. Pat. No. 6,726,857, U.S. Pat. No. 6,905,638, and U.S. Pat. No. 7,048,875.

Some of the vegetable dielectric oils that have been developed present in their compound a high content of oleic acid in order to strengthen the oxidative capacity of the oil, as described in U.S. Pat. No. 5,949,017, U.S. Pat. No. 6,274,067, U.S. Pat. No. 6,312,623, U.S. Pat. No. 6,645,404, and U.S. Pat. No. 7,048,875. However, like other vegetable dielectric fluids they incorporate antioxidants to their compound, and other synthetic additives to improve this property, as well as other characteristics of the oil.

It has been shown that the addition of antioxidants or synthetic additives to the current vegetable dielectric oils compensates for poor stability to natural oxidation within these fluids, however, from the ecological point of view this is not desirable, since the chemical composition of these additives may reduce the ability of biodegradation of the oil, besides damaging its non-toxic characteristic, it is known that some of these synthetic compounds present toxic characteristics.

Therefore, there is a clear need to provide a dielectric fluid from vegetable oils with suitable characteristics, not only in performance for its use in electrical apparatuses, but also in environmental issues through the incorporation of zero synthetic additives or external antioxidants in its composition.

SUMMARY OF THE INVENTION

Referring to the aforementioned and with the aim of finding a solution to the constraints encountered, it is the object of the invention to provide a vegetable dielectric fluid composition comprising of 60% to 80% in weight of mono-unsaturated fatty acid; of 2% to 23% in weight of di-unsaturated fatty acid; of 0.5% to 7% in weight of tri-unsaturated fatty acid; and of 5% to 8% in weight of saturated fatty acid, wherein said dielectric fluid is free of external antioxidant compounds and has the properties of a dielectric strength of 40 kV to 70 kV at a separation of 2 mm, a dielectric constant of 2.5 to 3.1 at 25° C., a dissipation factor of 0.05% to 0.15% at 25° C., a viscosity less than 50 cSt at 40° C., an acid number less than 0.06 mg KOH/g, a pour point temperature of at least −18° C., and an ignition temperature over 300° C.

Another object of the invention is to provide a dielectric fluid composition comprising a vegetable mixture of 95.5% to 99.25% in weight of at least a high oleic vegetable oil; of 0.25% to 1.5% in weight of grape seed oil; of 0.25% to 1.5% in weight of sesame seed oil, and of 0.25% to 1.5% in weight of rice bran oil.

Another object of the invention is to provide a method for producing a dielectric fluid free of antioxidants and/or external additives; the method consists of the following steps: mixing two or more crude vegetable oils, removing hydrophibic phospholipids and non-hydrophobics from the mixture of vegetable oils, by adding food grade citric acid within a temperature-controlled reactor; distilling under high vacuum the mixture of vegetable oils to remove free fatty acids present; removing impurities from the mixture of vegetable oil, shaking it under a direct dry steam in a high-vacuum chamber with convection heat coils; and filtering the mixture of vegetable oils by a barrier filter system to remove the remaining impurities.

Finally, it is the object of the invention to offer an electrical apparatus using a vegetable dielectric fluid containing of 60% to 80% in weight of mono-unsaturated fatty acid; of 2% to 23% in weight of di-mono-unsaturated fatty acid; of 0.5% to 7% in weight of tri-unsaturated fatty acid; and of 5% to 8% in weight of saturated fatty acid, wherein the dielectric fluid is free of external antioxidant compounds and having the properties of a dielectric strength of 40 kV to 70 kV at a separation of 2 mm, a dielectric constant of 2.5 to 3.1 at 25° C., a dissipation factor of 0.05% to 0.15% at 25° C., a viscosity less than 50 cSt at 40° C., an acid number less than 0.06 mg KOH/g, a pour point temperature of at least −18° C., and an ignition temperature of at least 300° C.

DETAILED DESCRIPTION OF THE INVENTION

The characteristic details of the invention are described in the following paragraphs, with the aim to define the invention, but without limiting the scope of it.

The vegetable dielectric oil of the present invention is a novel alternative of a dielectric fluid for applications in the electrical industry, with as a characteristic that it is free of external antioxidants in its composition. The term "free of external antioxidants" means, in the context of this description, that no substance or natural or synthetic compound has been added that improves the oxidative characteristics of the original composition of the crude vegetable oil to be processed, nor this substance or any compound is added during the process of refining the vegetable oil, nor is it added, neither requires to be added to the final composition of vegetable oil to be used in the dielectric fluid composition according to this invention.

The dielectric fluid composition according to the invention shows a combination of vegetable oils which that in turn may consist of multiple components.

In general, the vegetable oils are triglyceride compounds with a variety of fatty acids, which differ in the number of carbon atoms in the molecules (string length), the number of double bonds in the chain (degree of saturation), position of double bonds in the chain and the geometry of each bond. Fatty acids are organic acids (carboxylic acid) with a long molecular chain of more than 12 carbons, which can be saturated or unsaturated. Most saturated fatty acids are solid at room temperature, while the nature of unsaturated acids (mono-unsaturated or poly-unsaturated) are usually liquids.

In general, unsaturated fatty acids, which contain one (mono-unsaturated) or more double bonds (poly-unsaturated), are the main causes of oxidative reactions in vegetable oils because the double bonds are highly susceptible to the attack of oxygen. Because of the former, it is preferable that vegetable oils for electrical appliances present high contents of mono-unsaturated fatty acids, and preferably fatty acids that are of the oleic type (C18:1) since they are more stable to oxidation at room temperature as well as at elevated temperatures.

In accordance with the present invention, the composition of the vegetal dielectric fluid shows characteristics suitable for its use in electrical apparatuses without the need to add antioxidants or any other external synthetic additive. The former is achieved through the incorporation of vegetable oils with high oleic acid content, as well as the mixture with other vegetable oils.

Vegetable oils that constitute the dielectric fluid of this invention are described individually below, without necessarily being described in an order of importance.

High Oleic Vegetable Oils

The dielectric fluid composition of this invention can make use of oil of low erucic rape seeds of the *Brassica napus* species, oil of high oleic safflower seeds of the *Carthamus tinctorius* species, oil of high oleic sunflower seeds of the *Helianthus annuus* species, and combinations thereof.

Low erucic rapeseed oil presents good characteristics because of its natural composition, formed by a very high percentage of oleic fatty acid. This oil comes from the seeds obtained of the varieties of turnip with a low erucic acid contents (*Brassica napus*). It is obtained by mechanical extraction and/or solvents. It excels by its low content of saturated fatty acids.

In terms of fatty acids, the composition of the high oleic rapeseed oil that can be used in the invention is as follows:
 of 52% to 67% in weight of mono-unsaturated fatty acid;
 of 16% to 25% in weight of di-unsaturated fatty acid;
 of 6% to 14% in weight of tri-unsaturated fatty acid, and
 of 4.4% to 8.5% in weight of saturated fatty acid.

In terms of fatty acid components, the composition of high oleic rapeseed oil used in the invention is as follows:

of 52% to 67% in weight of oleic acid (C18:1);
of 16% to 25% in weight of linoleic acid (C18:2);
of 6% to 14% in weight of linolenic acid (C18:3);
of 3.3% to 6% in weight of palmitic acid (C16:0); and
of 1.1% to 2.5% in weight of stearic acid (C18:0).

The high oleic safflower oil comes from a natural genetic variety of safflower, whose fatty acid composition is different from the traditional one. It contains a high level of mono-unsaturated acid (oleic acid). It is very stable and has a light yellow color.

In terms of fatty acids, the composition of the high oleic safflower oil used in the invention is as follows:
of 74% to 80% in weight of mono-unsaturated fatty acid;
of 13% to 20% in weight of di-unsaturated fatty acid;
of 6% to 14% in weight of tri-unsaturated fatty acid; and
of 6.5% to 8.5% in weight of saturated fatty acid.

In terms of fatty acid components, the composition of high oleic safflower oil used in the invention is as follows:
of 74% to 80% in weight of oleic acid (C18:1);
of 13% to 20% in weight of linoleic acid (C18:2);
of 6% to 14% in weight of linolenic acid (C18:3);
of 5% to 6% in weight of palmitic acid (C16:0); and
of 1.5% to 2.5% in weight of stearic acid (C18:0).

In terms of fatty acids, the composition of the high oleic sunflower oil used in the invention is as follows:
of 74% to 88% in weight of mono-unsaturated fatty acid;
of 1% to 8% in weight of di-unsaturated fatty acid;
of 0.5% to 2% in weight of tri-unsaturated fatty acid, and
of 5% to 9% in weight of saturated fatty acid.

In terms of fatty acid components, the composition of high oleic sunflower oil used in the invention is as follows:
of 74% to 88% in weight of oleic acid (C18:1);
of 1% to 8% in weight of linoleic acid (C18:2);
of 0.5% to 2% in weight of linolenic acid (C18:3);
of 3% to 5% in weight of palmitic acid (C16:0); and
of 2% to 4% in weight of stearic acid (C18:0).

Grape Seed Oil

The grape seed oil used in the invention is a vegetable oil derived from the seeds of grapes of the *Vitis* species or its varieties.

The grape seed oil presents good dielectric characteristics, mainly its property of dielectric strength. This oil is incorporated into the composition of this invention to improve said dielectric property.

In terms of fatty acids, the composition of grape seed oil used in this invention is as follows:
of 12% to 29.2% in weight of mono-unsaturated fatty acid;
of 58% to 78% in weight of di-unsaturated fatty acid;
from trace amount to 1% in weight of tri-unsaturated fatty acid; and
of 8.5% to 19.5% in weight of saturated fatty acid.

In terms of fatty acids, the composition of grape seed oil used in this invention is as follows:
of 12% to 28% in weight of oleic acid (C18:1);
from trace amount to 1.2% in weight of palmitoleic acid (C16:1);
of 58% to 78% in weight of linoleic acid (C18:2);
from trace amount to 1% in weight of linolenic acid (C18:3);
from trace amount to 0.5% in weight of lauric acid (C12:0);
from trace amount to 0.3% in weight of myristic acid (C14:0);
of 5.5% to 11% in weight of palmitic acid (C16:0);
of 3% to 6% in weight of stearic acid (C18:0);
from trace amount to 1% in weight of arachidic acid (C20:0);
from trace amount to 0.3% in weight of behenic acid (C22:0); and
from trace amount to 0.4% in weight of lignoceric acid (C24:0).

The grape seed oil, moreover, contains natural antioxidants such as polyphenols, including proanthocyanidins.

Sesame Seed Oil

The sesame seed oil used in this invention is a vegetable oil derived from the seeds of sesame of the *Sesamum indicum* species.

In terms of fatty acids, the composition of sesame seed oil used in this invention is as follows:
of 33.6% to 44.6% in weight of mono-unsaturated fatty acid;
of 40.3% to 50.8% in weight of di-unsaturated fatty acid;
of 0.3% to 0.7% in weight of tri-unsaturated fatty acid; and
of 12.6% to 18.3% in weight of saturated fatty acid.

In terms of the components of fatty acids, the composition of sesame seed oil used in this invention is as follows:
of 33.5% to 44.1% in weight of oleic acid (C18:1);
of 0.1% to 0.2% in weight of palmitoleic acid (C16:1);
from trace amount to 0.3% in weight of gadoleic acid (C20:1);
of 40.3% to 50.8% in weight of linoleic acid (C18:2);
of 0.3% to 0.7% in weight of linolenic acid (C18:3);
from trace amount to 0.1% in weight of myristic acid (C14:0);
of 7.9% to 10.2% in weight of palmitic acid (C16:0);
of 4.4% to 6.7% in weight of stearic acid (C18:0);
of 0.3% to 0.7% in weight of arachidic acid (C20:0);
from trace amount to 0.3% in weight of behenic acid (C22:0); and
from trace amount to 0.3% in weight of lignoceric acid (C24:0).

Other components of the sesame seed oil are its antioxidants, which belong to the family of the lignans. Among them, there are: sesamin, sesamolin, sesamol, sesaminol, sesamolina, sesamolinol and pinoresinol. These phenolic compounds bring stability to the fatty acids present in the dielectric fluid composition of the invention.

The presence of free radicals in the sesamol and sesamolin, causes any contaminant present in a transformer (water, corrosion, heavy metals, etc.) to be trapped by these radicals, avoiding thus any loss of the properties of the dielectric fluid of the present invention.

Rice Bran Oil

The rice bran oil used in the invention is a vegetable oil derived from rice bran of the *Oryza sativa* species.

In terms of fatty acids, the composition of rice bran oil used in the invention is as follows:
of 38.3% to 49% in weight of mono-unsaturated fatty acid;
of 16% to 36% in weight of di-unsaturated fatty acid;
of 0.2% to 2.2% in weight of tri-unsaturated fatty acid; and
of 18.5% to 34.5% in weight of saturated fatty acid.

In terms of fatty acids, the composition of rice bran oil used in the invention is as follows:
of 38% to 48% in weight of oleic acid (C18:1);
from trace amount to 0.5% in weight of palmitoleic acid (C16:1);
of 0.3% to 0.5% in weight of gadoleic acid (C20:1);
of 16% to 36% in weight of linoleic acid (C18:2);
of 0.2% to 2.2% in weight of linolenic acid (C18:3);
of 0.5% to 0.7% in weight of myristic acid (C14:0);
of 16% to 28% in weight of palmitic acid (C16:0);
of 2% to 4% in weight of stearic acid (C18:0);
of 0.5% to 0.8% in weight of arachidic acid (C20:0);
of 0.1% to 0.5% in weight of behenic acid (C22:0); and from trace amount to 0.5% in weight of lignoceric acid (C24:0).

Other components of rice bran oil are its natural antioxidants, mainly the so-called gamma-orizanol, which is present in a range of 1% to 2% in weight, and which is a ferulic acid ester of triterpenic alcohols. This compound brings stability to the fatty acids present in the dielectric fluid composition of the invention.

Preparation Mode, Mixture, Process, and Composition of the Dielectric Fluid of the Invention The process to produce the dielectric fluid of the invention starts with the preparation of a crude high oleic vegetable oil mixture, crude grape seed oil, crude sesame seed oil, and crude rice bran oil, combining the following quantities:

of 95.5% to 99.25% in weight of at least one high oleic vegetable oil;
of 0.25% to 1.5% in weight of grape seed oil;
of 0.25% to 1.5% in weight of sesame seed oil; and
of 0.25% to 1.5% in weight of rice bran oil.

Once the mixture of crude vegetable oils is prepared, it is subjected to a physical refining process, completely natural and without the help of synthetic agents or external antioxidants, which allows the dielectric fluid of the invention to be kept completely natural and free of external antioxidants.

The physical refining process of the invention consists of the steps of degumming, distillation, deodorization, filtering, winterizing, and polishing. It is very important to mention that through this process of physical refining, chemicals agents are excluded, used in traditional refining processes (process RBD), such as organic solvents, oxidant agents for neutralization, inorganic acids for degumming, inert gases to prevent oxidation, addition of synthetic antioxidants to improve the shelf life, among others.

Each of these steps is described below.

Degumming

In the step of degumming, the hydrophibic phospholipids and non-hydrophobics are removed from the crude vegetable oil by adding food grade citric acid within a temperature-controlled reactor of less than 50° C. The reactor is connected to a vacuum system (300 mmHg.) that prevents the oxidation of the oil and the phospholipids. After the reaction, the hydrophobic phospholipids by density decant and the non-hydrophobics form a cream, with the control product remaining in between both. A system of centrifugal force is responsible for the separation by densities.

Distillation

Once the vegetable oil is degummed, continue to the step of distillation. In this step, the fatty acid triglycerides in the form of free radicals, better known as free fatty acid (FFA) are distilled in high vacuum, that is, they are not neutralized as is commonly done in a traditional refining process of the RBD type.

Desodorization

Once the oil is distillated, deodorization of the oil is continued, by high-vacuum chambers (from 0 mmHg to 6 mmHg) with convection heating coils to achieve a temperature of 250° C., without burning the oil, because in the absence of oxygen, no combustion or polymerization reaction is generated. At this step, the oil is stirred directly with dry steam with the aim of causing a drag on the most hidden impurities molecules contained until now in the oil, achieving with this a finished oil, without color, nor peroxide, acid-free, odorless and without gums.

At this step of deodorization, by a drag system of distilled vapors that contain the impurities from the oil, such as acid chains of free radicals, smells, tastes, pigments and peroxides. This is accomplished through a packed bed working under a constant bath of free fatty acids, which allow dissolving the impurities from the vapors that leave towards the vacuum system. This collection system allows the complete separation of these impurities from the oil.

Filtration

Once the oil is deodorized, any remaining impurities are separated by filtration from the oil, for example, the pigments that are absorbed. Therefore, the deodorized oil is passed through a barrier filter system of approximately 5 microns opening.

Winterizing

Once the oil is filtered, then it is proceeded to extract the wax contained therein through a cold chamber, which is to cool the filtered oil at a temperature of 0° C. to 5° C. with the aim to encourage the formation of waxes that by density decant in the bottom part of the container. This avoids the turbidity of the oil when stored at low temperatures thus improving the pour point temperature.

Polishing

As an alternative, once the oil has been winterized, it is proceeded, through a multiple filtering system to separate the oil waxes, giving a terminal brightness, translucency and crystalline.

In terms of fatty acids, the composition of the dielectric fluid of the invention, once physically refined, is as follows:

of 60% to 80% in weight of mono-unsaturated fatty acid;
of 2% to 23% in weight of di-unsaturated fatty acid;
of 0.5% to 7% in weight of tri-unsaturated fatty acid; and
of 5% to 8% in weight of saturated fatty acid;

In terms of the components of fatty acids, the composition of the dielectric fluid of this invention is as follows:

of 60% to 80% in weight of oleic acid (C18:1);
of 2% to 23% in weight of linoleic acid (C18:2);
of 0.5% to 7% in weight of linolenic acid (C18:3);
of 3% to 5% in weight of palmitic acid (C16:0); and
of 2% to 3% in weight of stearic acid (C18:0).

In one particular implementation, using low erucic rapeseed oil in the composition of the dielectric fluid of the invention, in terms of fatty acid components, these are as follows:

of 60% to 63% in weight of mono-unsaturated fatty acid;
of 20% to 23% in weight of di-unsaturated fatty acid;
of 5% to 7% in weight of tri-unsaturated fatty acid; and
of 6% to 8% in weight of saturated fatty acid.

In this particular embodiment, the composition of the dielectric fluid of this invention is as follows:

of 60% to 63% in weight of oleic acid;
of 20% to 23% in weight of linoleic acid;
of 5% to 7% in weight of linolenic acid;
of 4% to 5% in weight of palmitic acid; and
of 2% to 3% in weight of stearic acid.

The levels of impurities of the dielectric fluid composition of this invention, determined by the Official methods of the American Oil Chemists' Society (AOCS) are the following:

less than 0.05% in weight of free fatty acids under the AOCS Ca 5a-40 method;
0 ppm of soap under the AOCS Cd 17-95 method; and
less than 2 meq/kg of peroxid index.

Physical Properties of the Composition of the Dielectric Fluid of the Invention

The dielectric fluid composition of the invention has specific physical properties that make them particularly suited for use as a fluid for electrical insulation, said properties being:

a dielectric strength of 40 kV to 70 kV at a separation of 2 mm and preferably of 40 kV to 55 kV at a separation of 2 mm;
a dielectric constant of 2.5 to 3.1 at 25° C.;

a dissipation factor of 0.05% to 0.15% at 25° C. and preferably of 0.06% to 0.1% at 25° C.;
a viscosity less than 50 cSt at 40° C.;
an acid number less than 0.6 mg KOH/g;
a pour point temperature of −18° C. to −10° C. and preferably of −15° C. to −12° C.; and
an ignition temperature of at least 300° C.

The dielectric strength, the dielectric constant, the dissipation factor, the pour point temperature and the acid number are measured using each test methods of the American Society for Testing and Materials (ASTM). The dielectric strength is determined using the test method ASTM D1816. The dielectric constant is determined using the test method ASTM D924. The dissipation factor is determined using the test method ASTM D924. The viscosity is determined using standard ASTM D445. The pour point temperature is determined using the test method ASTM D97. The acid number is determined using the test method ASTM D974.

In some embodiments, the pour point temperature or flow point of the dielectric fluid of the invention can be further reduced by prolonging its cooling time. Essentially, the obtained dielectric fluid is cooled or frozen by decreasing the temperature to near or below 0° C. for a period of approximately 72 hours and removing the solidified components. The stage of cooling or freezing can be performed as a series of reductions in temperature followed by the removal of solids at said temperatures.

Examples of Embodiment of Invention

The invention will now be described with respect to the following examples, which are solely for the purpose of representing the way of carrying out the implementation of the principles of the invention. The following examples are not intended to be a comprehensive representation of the invention, nor try to limit the scope of it.

Table 1 shows examples of dielectric fluid compositions according to the invention.

TABLE 1

| Component | Example 1 | Example 2 | Example 3 |
| --- | --- | --- | --- |
| % in weight of low erucic rapeseed oil | 98.5 | 97 | 95.5 |
| % in weight of grape seed oil | 0.5 | 1 | 1.5 |
| % in weight of sesame seed oil | 0.5 | 1 | 1.5 |
| % in weight of rice bran oil | 0.5 | 1 | 1.5 |

Table 2 illustrates the physical properties obtained for each of the examples in Table 1.

TABLE 2

| Physical properties | Example 1 | Example 2 | Example 3 |
| --- | --- | --- | --- |
| Dielectric strength (kV) 25° C. at 2 mm, ASTM D1816 | 60 | 47.4 | 47.6 |
| Dielectric constant at 25° C. ASTM D924 | 2.6 | 2.5 | 2.6 |
| Dissipation factor at 25° C. ASTM D924 | 0.114 | 0.116 | 0.114 |
| Pour point temperature (° C.) ASTM D97 | −15 | −15 | −15 |
| Acid number (mg KOH/gr) ASTM D974 | 0.051 | 0.053 | 0.053 |
| Viscosity (cSt) at 40° C. | 38 | 43 | 41 |

The dielectric fluid composition according to the invention is a natural composition based on the mixture of vegetable oils, free of external antioxidants and complies with the current requirements and specifications for plant-type dielectric fluids, making feasible its implementation in electrical appliances, including electrical transformers, capacitors or transmission cables. Unlike the current dielectric vegetable oils, to which synthetic compounds are incorporated, this invention provides a composition free of external antioxidants whether natural, synthetic or mixtures thereof in its formulation, obtaining the final characteristics through a physical refining process. The result is a completely natural dielectric fluid, highly biodegradable, such characteristics that allow minimizing to the maximum a negative impact on the environment, for any fluid spill accidents, generation of toxic wastes and fire hazards.

Finally, it should be understood that the dielectric fluid composition based on a mixture of vegetable oils and free of external antioxidants and the method for obtaining it from the present invention are not limited to the mode or modes described above and that experts in the field are trained herein, for the teachings that are shown herein, to make changes in the composition of the dielectric fluid free of external antioxidants and the method for obtaining it of the present invention, whose scope is established exclusively for the following claims:

The invention claimed is:

1. A dielectric fluid composition, comprising:
   from 95.5% to 99.25% by weight of at least one high oleic vegetable oil selected from a group of consisting of low erucic rapeseed oil, high oleic sunflower oil, high oleic safflower oil, and combinations thereof;
   from 0.25% to 1.5% by weight of grape seed oil;
   from 0.25% to 1.5% by weight of sesame seed oil; and
   from 0.25% to 1.5% by weight of rice bran oil;
   wherein said dielectric fluid is free external antioxidants and has:
   a dielectric strength of 40 kV to 70 kV at a separation of 2 mm;
   a dielectric constant of 2.5 to 3.1 at 25° C.; and
   a dissipation factor of 0.05% to 0.15% at 25° C.

2. The dielectric fluid composition of claim 1, wherein the dielectric fluid has a dielectric strength of 40 kV to 55 kV at a separation of 2 mm.

3. The dielectric fluid composition of claim 1, wherein the dielectric fluid has a dissipation factor of 0.06% to 0.1% at 25° C.

4. The dielectric fluid composition of claim 1, wherein the dielectric fluid has:
   a viscosity less than 50 cSt at 40 ° C.;
   a pour point temperature of −18 ° C. to −10 ° C.;
   an acid number less than 0.06 to 0.1 mg KOH/g; and
   an flash point temperature of at least 300 ° C.

5. The dielectric fluid composition of claim 4, wherein the dielectric fluid has a pour point temperature of −15° C. to −12° C.

6. The dielectric fluid composition of claim 1, wherein the dielectric fluid has:
   less than 0.05% by weight of free fatty acids;
   0 ppm of soap; and
   less than 2 meq/kg of peroxide index.

7. The dielectric fluid composition of claim 1, wherein, in terms of fatty acids, the dielectric fluid comprises:
   from 60% to 80% by weight of oleic acid;
   from 2% to 23% by weight of linoleic acid;
   from 0.5% to 7% by weight of linolenic acid;
   from 3% to 5% by weight of palmitic acid; and
   from 2% to 3% by weight of stearic acid.

8. The dielectric fluid composition of claim 1, wherein, in terms of fatty acids, the dielectric fluid comprises:
   from 60% to 80% by weight of mono-unsaturated fatty acid;
   from 2% to 23% by weight of di-unsaturated fatty acid;
   from 0.5% to 7% by weight of tri-unsaturated fatty acid; and
   from 5% to 8% by weight of saturated fatty acid.

9. The dielectric fluid composition of claim 7, wherein the dielectric fluid comprises:
   from 60% to 63% by weight of oleic acid;
   from 20% to 23% by weight of linoleic acid;
   from 5% to 7% by weight of linolenic acid;
   from 4% to 5% by weight of palmitic acid; and
   from 2% to 3% by weight of stearic acid.

10. The dielectric fluid composition of claim 1, wherein the low erucic rapeseed oil is oil of low erucic rape seeds of *Brassica napus* species.

11. The dielectric fluid composition of claim 1, wherein the high oleic safflower oil is oil of high oleic safflower seeds of *Carthamus tinctorius* species.

12. The dielectric fluid composition of claim 1, wherein the high oleic sunflower oil is oil of high oleic sunflower seeds of *Helianthus annuus* species.

13. The dielectric fluid composition of claim 1, wherein the grape seed oil is oil of grape seed of *Vitis* species.

14. The dielectric fluid composition of claim 1, wherein the sesame seed oil is oil of sesame seeds of *Sesamum indicum* species.

15. The dielectric fluid composition of claim 1, wherein the rice bran oil is oil of rice bran of *Oryza sativa* species.

* * * * *